(12) United States Patent
Wu et al.

(10) Patent No.: US 11,366,005 B2
(45) Date of Patent: Jun. 21, 2022

(54) WEIGHING SENSOR AND LEVER

(71) Applicants:Mettler Toledo Instrument (Shanghai) Company Limited, Shanghai (CN); Mettler-Toledo International Trading (Shanghai) Co., Ltd., Shanghai (CN)

(72) Inventors: Chao Wu, Shanghai (CN); Baohui Liu, Shanghai (CN); Weixiang Sun, Shanghai (CN); Chun Yang, Shanghai (CN); Naifeng Bian, Shanghai (CN); Feng Xu, Shanghai (CN)

(73) Assignees: Mettler Toledo Instrument (Shanghai) Company Limited, Shanghai (CN); Mettler-Toledo International Trading (Shanghai) Co., Ltd., Shanghai (CN)

( * ) Notice: Subject to any disclaimer, the term of this patent is extended or adjusted under 35 U.S.C. 154(b) by 65 days.

(21) Appl. No.: 16/764,467

(22) PCT Filed: Nov. 30, 2018

(86) PCT No.: PCT/CN2018/118401
§ 371 (c)(1),
(2) Date: May 15, 2020

(87) PCT Pub. No.: WO2019/109859
PCT Pub. Date: Jun. 13, 2019

(65) Prior Publication Data
US 2020/0355544 A1 Nov. 12, 2020

(30) Foreign Application Priority Data
Dec. 4, 2017 (CN) .......................... 201711260562.X (51) Int. Cl.
*G01G 7/02* (2006.01)
*G01G 21/24* (2006.01)

(52) U.S. Cl.
CPC ............... *G01G 7/02* (2013.01); *G01G 21/24* (2013.01); *G01G 21/244* (2013.01)

(58) Field of Classification Search
CPC ............................. G01G 21/24; G01G 21/244
See application file for complete search history.

(56) References Cited

U.S. PATENT DOCUMENTS 4,825,968 A * 5/1989 Maaz ....................... G01G 7/04
177/212
5,771,986 A * 6/1998 Kohn ................... G01G 21/244
177/210 EM
(Continued)

FOREIGN PATENT DOCUMENTS

| CN | 203464985 U | 3/2014 |
| CN | 204854905 U | 12/2015 |

(Continued)

*Primary Examiner* — Natalie Huls
(74) *Attorney, Agent, or Firm* — Standley Law Group LLP; Jeffrey S. Standley; Stephen L. Grant (57) ABSTRACT

A weighing sensor and a lever are disclosed. The weighing sensor has a load-receiving portion, a fixing portion, and a parallel guiding portion connected to the load-receiving portion and the fixing portion. The parallel guiding portion has upper and lower parallel guiding units, separated from each other. The ends of the parallel guiding units are connected to the load-receiving portion and the fixing portion. The fixing portion has an extension located between the parallel guiding units. The extension is at a distance from both parallel guiding units and extends to the load-receiving portion. A gap is formed between the extension and the load-receiving portion; and the distance between the extension and the upper parallel guiding unit allows a lever to pass through. The weighing sensor has a simple structure, both the processing process and the assembly process are simplified, and the processing and assembly during production are facilitated.

10 Claims, 4 Drawing Sheets

(56) References Cited

U.S. PATENT DOCUMENTS

| | | | | |
|---|---|---|---|---|
| 6,365,847 | B1* | 4/2002 | Muller | G01G 7/02 |
| | | | | 177/210 EM |
| 7,432,458 | B2 | 10/2008 | Hauck | |
| 9,915,558 | B2* | 3/2018 | Gottfriedsen | G01G 7/02 |
| 9,927,284 | B2 | 3/2018 | Graf | |
| 11,131,574 | B2* | 9/2021 | Bornemann | G01G 7/02 |
| 2004/0003948 | A1* | 1/2004 | Kuhlmann | G01G 23/012 |
| | | | | 177/132 |
| 2007/0034419 | A1* | 2/2007 | Kuhlmann | G01G 7/04 |
| | | | | 177/136 |
| 2007/0125185 | A1* | 6/2007 | Hauck | G01G 21/244 |
| | | | | 73/862.621 |
| 2008/0029315 | A1* | 2/2008 | Kuhlmann | G01G 21/244 |
| | | | | 177/225 |
| 2009/0065265 | A1* | 3/2009 | Hauck | G01G 21/244 |
| | | | | 177/210 EM |
| 2011/0278077 | A1* | 11/2011 | Erben | G01G 7/02 |
| | | | | 177/211 |
| 2014/0020960 | A1* | 1/2014 | Metzger | G01G 21/26 |
| | | | | 177/1 |
| 2017/0138783 | A1* | 5/2017 | Izumo | G01G 21/244 |
| 2017/0284857 | A1* | 10/2017 | Hauck | G01G 21/244 |
| 2020/0340849 | A1* | 10/2020 | Burisch | B33Y 80/00 |
| 2020/0386606 | A1* | 12/2020 | Wu | G01G 7/02 |
| 2021/0199487 | A1* | 7/2021 | Wu | G01G 21/244 |

FOREIGN PATENT DOCUMENTS

| | | |
|---|---|---|
| CN | 106197624 A | 12/2016 |
| DE | 3743073 A1 | 7/1988 |
| DE | 202005002369 U1 | 5/2005 |

\* cited by examiner

WEIGHING SENSOR AND LEVER

FIELD OF THE INVENTION

The present invention relates to a weighing sensor and a lever, particularly to a weighing sensor and a lever used in an electronic balance.

THE RELATED ART

At present, the weighing sensors used in an electronic balance are basically electromagnetic force compensation sensors, and with the continuous development of technology, higher requirements for the weighing sensors used in the electronic balance have been put forward, such as smaller volume, higher precision, lower cost and simpler assembly.

The conventional weighing sensor takes a die casting as a main assembly component, so the volume is large, the parts are numerous, the assembly is complicated, the assembly tolerance is large, and the quality is not stable enough, and in order to improve the deficiencies of the weighing sensor of the die casting structure, the current weighing sensor uses a structure of a highly integrated single-module weighing sensor and a semi-integrated weighing sensor. However, such a structure usually has complicated processing processes, inconvenient assembly, and high costs.

In the assembly process of the sensor, the assembly of the lever is a very important assembly process and directly relates to the weighing performance of the weighing sensor.

At present, one of the assembly methods of the lever is assembling from the periphery of the sensor. As a result, the size of the lever is relatively large and is also easily influenced by external factors due to the location at the periphery of the sensor.

In addition, a further assembly method is directly assembling from top to bottom, that is, after the lever is mounted, a guiding sheet is then assembled, so that this assembly method requires more assembly time and assembly parts and is not economical.

Furthermore, the method of integrally forming the lever and the sensor body into an integral structural member does not have the above-mentioned problem of assembly, but this method has higher costs and is not conducive to production.

SUMMARY

The technical problem to be solved by the present invention is to overcome the drawbacks such as the complicated processing processes and inconvenient assembly of the weighing sensor in the prior art, and the structure of the provided weighing sensor and the lever therefore simplifies the processing processes and the assembly processes, thereby saving the production cost.

The above-mentioned technical problems are solved in the present invention by the following technical solution:

The present invention provides a weighing sensor, comprising: a load-receiving portion, a fixing portion, and a parallel guiding portion connecting the load-receiving portion and the fixing portion, wherein the parallel guiding portion comprises an upper parallel guiding unit and a lower parallel guiding unit which are separated from each other, wherein two ends of the upper parallel guiding unit and two ends of the lower parallel guiding unit are respectively connected to the load-receiving portion and the fixing portion;

wherein an extension of the fixing portion is located between the upper parallel guiding unit and the lower parallel guiding unit, the extension is provided at a distance from both the upper parallel guiding unit and the lower parallel guiding unit and extends to the load-receiving portion, and a gap is formed between the extension of the fixing portion and the load-receiving portion; and wherein the distance between the extension and the upper parallel guiding unit is able to allow a lever to pass through and enter into a lever accommodating space formed by the fixing portion, the upper parallel guiding unit, and the load-receiving portion.

The extension of the fixing portion of the present invention divides the parallel guiding portion into two different spaces, wherein the distance between the upper parallel guiding unit and the extension of the fixing portion in the space formed by a combination of the upper parallel guiding unit and the extension of the fixing portion is large enough to allow the lever to pass through and assemble same into the space formed by a combination of the fixing portion, the upper parallel guiding unit and the extension of the fixing portion of the weighing sensor.

Preferably, the parallel guiding portion, the fixing portion and the load-receiving portion are integrally formed.

In the present invention, all the components are integrally formed, and such a design makes the structure of the weighing sensor simple and also facilitates the processing and assembly.

Preferably, the connection portion between the parallel guiding portion and either of the fixing portion and the load-receiving portion is a thin sheet.

In the present invention, all the connecting parts between the various components are cut into thin sheets by means of the existing processing processes and requirements of the weighing sensor, thereby further enhancing the relative movement range of each part.

Preferably, the extension of the fixing portion and the load-receiving portion are further detachably connected by means of a temporary connecting sheet.

In the present invention, the extension and the load-receiving portion are fixed by temporarily and fixedly connecting the components, that is, the fixing portion and the load-receiving portion are integrally fixed, so that the influence on the weighing sensor of accidental shocks, especially unexpected shocks during transportation, can be avoided.

Preferably, the extension and the load-receiving portion are connected by means of a connecting portion which is a thin sheet.

In the present invention, it is also possible to connect the extension of the fixing portion and the load-receiving portion in advance during the manufacturing process, and the connection is also processed into a thin sheet, which can also avoid the influence of accidental shocks on the weighing sensor. At the same time, at the place where the connection of the extension of the fixing portion and the load-receiving portion is not necessary, the thin sheet can be cut off to cut down the connection between the extension of the fixing portion and the load-receiving portion. In this way, a cutting-down action on the thin sheet can be further used to adjust the stress in the entire weighing sensor.

Preferably, cross-sectional lengths of end portions at the two ends of the upper parallel guiding unit that are respectively connected to the load-receiving portion and the fixing portion are equal.

For example, the upper parallel guiding unit is formed in a rectangular-like shape between the load-receiving portion and the fixing portion, or in other shapes with the sides at two ends having the same length.

Preferably, when the cross-sectional lengths of the end portions at the two ends of the upper parallel guiding unit that are respectively connected to the load-receiving portion and the fixing portion are different, then the distance between two sides of the upper parallel guiding unit gradually changes from the cross-sectional length of the end portion connected to the load-receiving portion to the cross-sectional length of the end portion connected to the fixing portion in a direction from the end portion connected to the load-receiving portion to the end portion connected to the fixing portion.

The two sides of the upper parallel guiding unit are two upper parallel guiding unit boundary contours adjacent to the end portions at the two ends that are connected to the load-receiving portion and the fixing portion.

Preferably, the distance between the two sides of the upper parallel guiding unit linearly changes from the cross-sectional length of the end portion connected to the load-receiving portion to the cross-sectional length of the end portion connected to the fixing portion.

Preferably, the fixing portion is provided with a mounting region for mounting a magnet, wherein the mounting region is provided with a plurality of grooves.

The mounting region in the present invention is a structure inside the fixing portion, for example, a mounting groove or a mounting opening provided on the fixing portion.

Preferably, a groove is provided respectively on two sides of the end of the mounting region that is away from the load-receiving portion. The stress is released by grooving.

Preferably, the load-receiving portion has a protrusion extending in a direction of fixing portion, and a through-hole is provided between the load-receiving portion and the protrusion in a direction perpendicular to the parallel guiding portion, wherein the protrusion is provided with a mounting region for mounting a leaf spring, and the leaf spring is provided at the mounting region by means of the through-hole.

The present invention simplifies the structure and mounting method of the load-receiving portion and the lever by means of the design of the through-hole.

Preferably, the protrusion is further provided with a mounting protrusion in a direction away from the upper parallel guiding unit.

In the present invention, the mounting portion for connecting the lever is further protruded, so as to facilitate mounting and maintaining.

Preferably, the load-receiving portion is provided with at least one through-hole in a direction of the parallel guiding portion, wherein the at least one through-hole faces the mounting protrusion or the mounting region.

By means of the through-hole, the present invention facilitates the operation of the mounting region or the mounting protrusion.

The present invention provides a lever for a weighing sensor as mentioned above, the lever comprising: a mounting portion connected to the fixing portion of the weighing sensor, a connecting portion, and a coil connecting portion for mounting a coil, wherein two ends of the connecting portion are respectively connected to the mounting portion and the coil connecting portion; and wherein the thickness of the lever is able to enter the lever accommodating space through an opening of the lever accommodating space of the weighing sensor.

In order to reduce the assembly components, the present invention improves the existing method of assembling the weighing sensor from the periphery, and redesigns the structure of the lever, so that by reducing the volume of the lever, especially the thickness of the lever, the lever can enter the lever accommodating space inside the weighing sensor through the opening of the lever accommodating space formed by the parallel guiding portion, the fixing portion, and the load-receiving portion of the weighing sensor. This prevents the lever from being located at the periphery of the sensor.

Moreover, since the lever accommodating space inside the existing weighing sensor is relatively large in length and width, the lever can enter the lever accommodating space as long as the thickness of the lever can meet the requirements, thereby realizing the assembly of the lever.

Preferably, the mounting portion, the connecting portion and the coil-connecting portion are integrally formed.

Further, the number of components, the difficulty of processing and assembling, and the cost are reduced.

Preferably, the connecting portion comprises a first body portion and a second body portion, which are connected to each other, wherein the first body portion and the mounting portion are integrally formed, and the second body portion and the coil connecting portion are integrally formed.

The present invention can further use a two-section structure to make the lever.

Preferably, the mounting portion is strip-like, and three mounting regions are provided in the lengthwise direction of the mounting portion, wherein the mounting regions are all used for mounting the leaf springs.

In the present invention, the mounting regions of the mounting portion are connected to the other components of the weighing sensor by means of the leaf springs.

Preferably, the connecting portion is a sheet-like triangle, wherein the base of the triangle is connected to the mounting portion, and the apex of the triangle is connected to the coil-connecting portion.

Such a structure of the present invention is more secure and easier to mount.

Of course, the present invention does not limit the specific shapes of the mounting portion and the connecting portion, and according to the shape of the lever accommodating space of the actual weighing sensor and the shape and size of the opening of the lever accommodating space, the shape and size of the connecting portion and the mounting portion of the lever can be arbitrarily adjusted.

Preferably, the coil-connecting portion is provided with a magnet coil assembly, or the coil-connecting portion is a magnet coil assembly.

The present invention further directly forms the connection part between the lever and the magnet into the magnet coil part, thereby simplifying the structure of the weighing sensor.

Preferably, the coil-connecting portion is further provided with a shading plate of a photoelectric sensor.

The present invention realizes the position detection using the movement of the lever to drive the shading plate of the photoelectric sensor.

The positive and progressive effects of the present invention lie in that:

the weighing sensor of the present invention has a simple structure, both the processing process and the assembly process are simplified, and the processing and assembly during production are facilitated.

In addition, the weighing sensor structure used in the present invention also reduces the production and processing cost. Moreover, the assembled weighing sensor has a smaller size and a more excellent performance.

BRIEF DESCRIPTION OF THE DRAWINGS

The above-mentioned and other features, characteristics and advantages of the present invention will be more apparent from the following description taken in conjunction with the accompanying drawings and embodiments, and in the accompanying drawings, same reference numerals indicate same features, in which.

| Reference numerals: | |
|---|---|
| Weighing sensor | 1 |
| Load-receiving portion | 11 |
| Body portion | 111 |
| First extension | 112 |
| First through-hole groove | 113 |
| First connection mounting portion | 114 |
| Second through-hole groove | 115 |
| Third through-hole groove | 116 |
| Fixing portion | 12 |
| Main body | 121 |
| Extension | 122 |
| Mounting portion | 1221, 1222 |
| Gap | 123 |
| Parallel guiding portion | 13, 13' |
| Upper parallel guiding plate | 131, 131' |
| Lower parallel guiding plate | 132, 132' |
| First through-hole | 133 |
| Second through-hole | 134 |
| Body portion | 1311, 1311' |
| Thin sheet | 1312, 1312' |
| First receiving space | 1241 |
| Second receiving space | 17, 1242 |
| Lever | 2, 2' |
| First mounting portion | 21, 21' |
| Second mounting portion | 22, 22' |
| Third mounting portion | 23, 23' |
| Body portion | 24, 24' |
| Fourth mounting portion | 25, 25' |
| Upper surface of the fourth mounting portion | 251, 251' |
| Coil assembly | 6, 6' |
| Lower surface of the coil assembly | 61, 61' |

DETAILED DESCRIPTION OF EMBODIMENTS

To make the above objects, features and advantages of the present invention more apparent and easy to understand, the present invention will be further described in detail below in conjunction with the accompanying drawings and particular embodiments.

Embodiments of the present invention will now be described in detail with reference to the accompanying drawings. Reference will now be made in detail to preferred embodiments of the present invention, examples of which are illustrated in the accompanying drawings. The same reference numerals used in all the figures denote identical or similar parts wherever possible.

Furthermore, although the terms used in the present invention are selected from well-known common terms, some of the terms mentioned in the description of the present invention may have been selected by the applicant according to his or her judgement, and the detailed meaning thereof is described in the relevant section described herein.

Furthermore, the present invention should be understood, not simply by the actual terms used but also by the meanings encompassed by each term.

In the present invention, the load-receiving portion, the fixing portion, and the parallel guiding portion, which are integrally formed can reduce the structural complexity, reduce the degree of processing load, and further facilitate the mounting of the lever by controlling the distance between the extension of the load-receiving portion and the parallel guiding portion.

In addition, further by temporarily connecting the extension of the load-receiving portion and the fixing portion, damage caused by accidental shocks and stress adjustment are avoided, and the stress of the weighing sensor is adjusted by the grooving of the fixing portion.

By means of the embodiments as described below, the implementations of the present invention are illustrated by way of examples.

Embodiment 1

Figure 1:
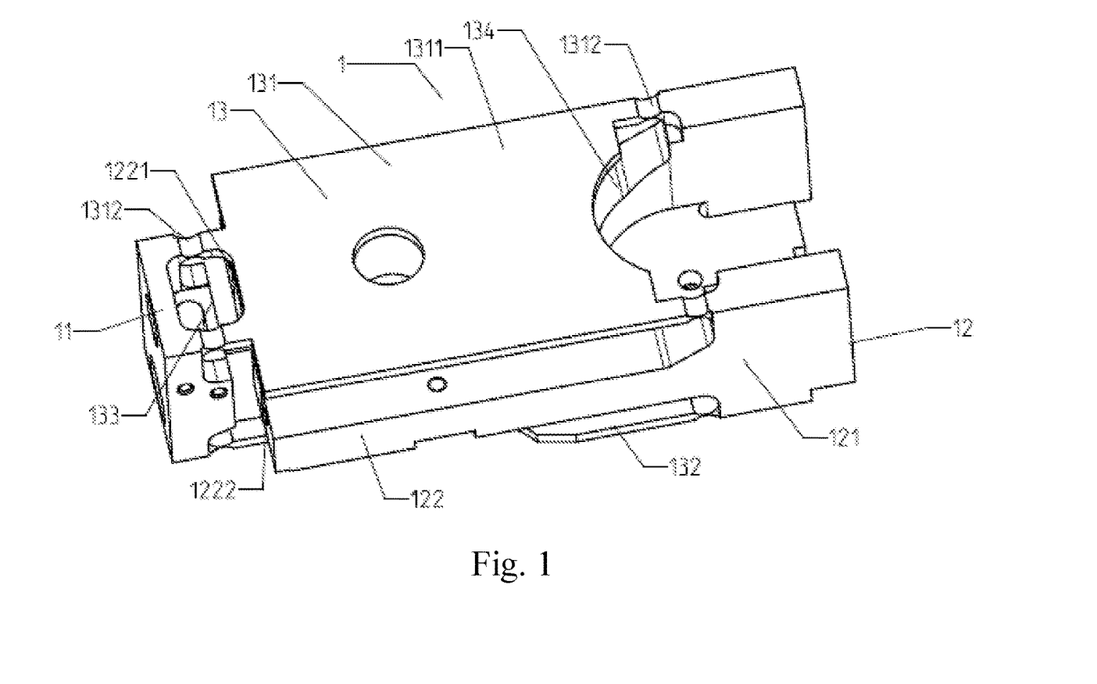
FIG. 1 is a perspective schematic diagram of a weighing sensor in Embodiment 1 of the present invention.

As shown in FIG. 1, the weighing sensor 1 in this embodiment comprises a load-receiving portion 11, a fixing portion 12, and a parallel guiding portion 13 connecting the load-receiving portion 11 and the fixing portion 12. In this embodiment, the load-receiving portion 11, the fixing portion 12, and the parallel guiding portion 13 are of an integrally formed structure, i.e., machined from a monolithic material, and such a design makes the weighing sensor 1 have a simple structure and more convenient to process and assemble.

Furthermore, in another embodiment, the load-receiving portion 11, the fixing portion 12, and the parallel guiding portion 13 may also be separate structures, and the weighing sensor 1 is formed by reassembling.

The fixing portion 12 comprises a main body 121 and an extension 122 formed by extending forward from a front end face of the main body 121. The main body 121 of the fixing portion 12 is provided with a mounting region (at the groove of the fixing portion 12 that has a circular through-hole in the figure) for mounting a magnet, wherein a first separation groove and a second separation groove (not shown in the figure) are provided on the mounting region from an upper surface to a lower surface on two sides of the main body 121. This arrangement can release the stress produced during assembly and improve the weighing performance of the weighing sensor.

In another embodiment, there are more grooves at the mounting region, such as four grooves, each pair of which being symmetrically arranged to each other. For a person skilled in the art, the number and forms of grooves can be freely designed according to the requirements and degrees of stress release, and are not limited to the number and forms of the grooves mentioned in the embodiments.

In this embodiment, two sides of the front end face of the extension 122 comprise a mounting portion 1221 and a mounting portion 1222 for connecting the lever to the extension 122. In this embodiment, the mounting portions 1221 and 1222 are respectively connected to the lever by means of leaf springs. In another embodiment, the extension can also be connected to the lever by means of only one leaf spring.

Figure 2:
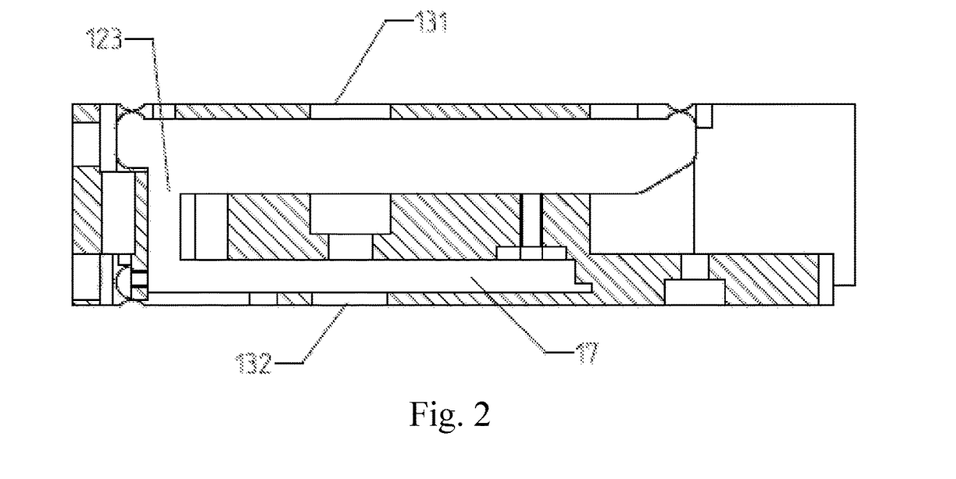
FIG. 2 is a sectional view taken along the centre line of the weighing sensor in Embodiment 1 of the present invention.

The extension 122 and the load-receiving portion 11 are separated by a transversely penetrating gap 123. As shown in FIG. 2, before the assembly is completed, in order to prevent the influence of unexpected shocks during transportation, in this embodiment, an integrally formed technique is used, the temporary connection between the extension 122 and the load-receiving portion 11 is realized by means of a cut thin sheet, and after the finished weighing sensor is assembled, the thin sheet is then cut down to form the transversely penetrating gap 123. At this time, a relative movement between the extension 122 and the load-receiving portion 11 is enabled.

In another embodiment, the extension 122 and the load-receiving portion 1 can also realise the fixed connection between the extension 122 and the load-receiving portion 11 by temporarily adding a hinged connection structure.

The parallel guiding portion 13 connects the fixing portion 12 together with the load-receiving portion 11, wherein the parallel guiding portion 13 comprises an upper parallel guiding plate 131 and a lower parallel guiding plate 132, and the upper parallel guiding plate 131 and the lower parallel guiding plate 132 both have a certain distance from the extension 122. The distance can be adjusted according to design requirements.

As shown in FIG. 1, the upper parallel guiding plate 131 comprises a body portion 1311 and thin sheets 1312 at two ends, wherein the two ends of the body portion 1311 are respectively connected to the fixing portion 12 and the load-receiving portion 11 by means of the two thin sheets. Since this embodiment is integrally formed, the thin sheets 1312 are both formed in a cutting process.

Furthermore, in this embodiment, the width of the body portion 1311 in a transverse direction is equal to the width of the fixing portion 12 in the transverse direction for the convenience of processing.

A first through-hole 133 penetrating from an upper surface to a lower surface of the upper parallel guiding plate 131 is provided at the upper parallel guiding plate 131 near the load-receiving portion 11, and a second through-hole 134 penetrating from the upper surface to the lower surface of the upper parallel guiding plate 131 is provided at the upper parallel guiding plate 131 near the fixing portion 12. The design of the size and shape of the first through-hole 133 and the second through-hole 134 varies with the structure of the lever, and is not limited to the shape and size shown in FIG. 1.

The main body 121 forms a first receiving space 1241 with the upper parallel guiding plate 131, the load-receiving portion 11 and the extension 122, and the main body 121 forms a second receiving space 17 with the lower parallel guiding plate 132, the load-receiving portion 11 and the extension 122. In this embodiment, the space volume of the first receiving space 1241 is greater than that of the second receiving space 17.

This arrangement is more convenient to assemble the lever, that is, the distance between the upper parallel guiding plate 131 and the extension 122 at this time is large enough to allow the lever to enter the first receiving space 1241 through the upper parallel guiding sheet 131 and the extension 122. In this embodiment, the lever may enter the first receiving space 1241 from the openings on two sides of the weighing sensor 1 as shown in the figure, and may also enter the first receiving space 1241 through the opening where the mounting region is located, wherein each opening is adapted to the different shapes of the lever, and the lever may enter the first receiving space 1241 from different openings according to the different shapes of the lever.

Figure 4:
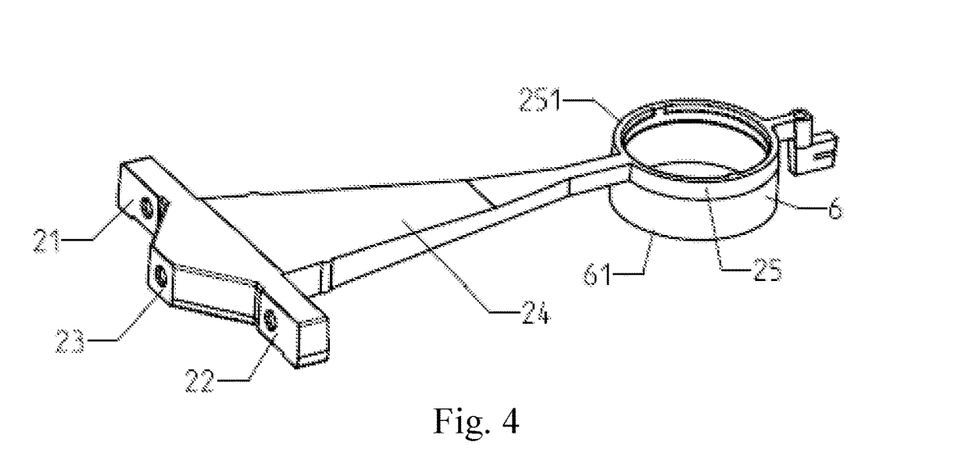
FIG. 4 is a perspective schematic diagram of a lever in Embodiment 1 of the present invention.
Figure 5:
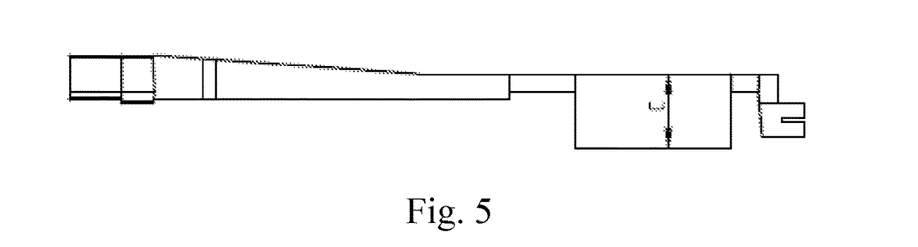
FIG. 5 is a sectional view taken along the centre line of the lever in Embodiment 1 of the present invention.
Figure 6:
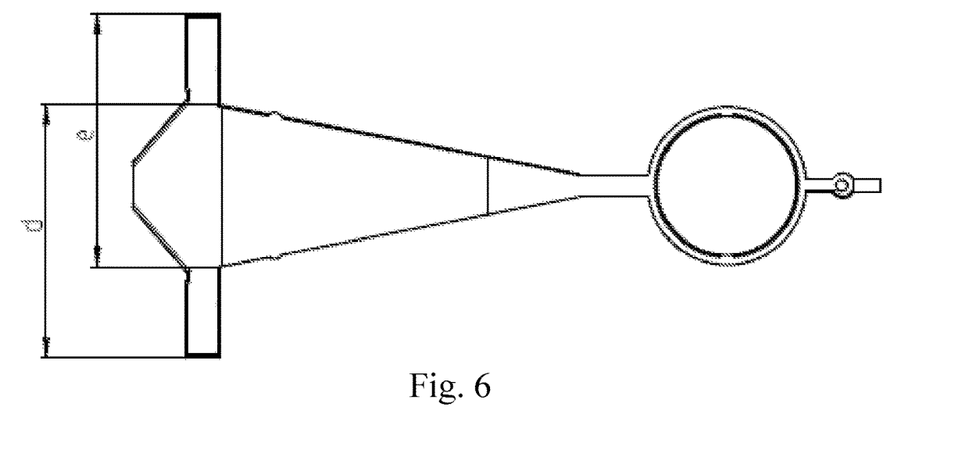
FIG. 6 is a top view of the lever in Embodiment 1 of the present invention.

As shown in FIGS. 4-6, a mounting portion of the lever 2 that is connected to the fixing portion of the weighing sensor in this embodiment comprises a first mounting portion 21, a second mounting portion 22, and a third mounting portion 23, wherein the three mounting portions are connected to the other components of the weighing sensor by means of the leaf springs. As shown in the figure, the mounting portions in this embodiment are approximately of a strip-like structure, and in another embodiment, the mounting portions may also be in other shapes such as an arc shape.

The lever 2 in this embodiment further comprises a body portion 24 and a fourth mounting portion 25, wherein one end of the body portion 24 is connected to the mounting portion, and the other end of the body portion is connected to the fourth mounting portion 25. In addition, the body portion 24, the fourth mounting portion 25 and the mounting portions are integrally formed and machined from a monolithic material, so that the lever has a simple structure and is easy to process.

The body portion 24 is approximately of a sheet-like triangular structure, wherein the base of the triangle is connected to the mounting portion, and the apex of the triangle is connected to the fourth mounting portion 25.

In another embodiment, the body portion 24 is of a strip-like structure. In a variant, the body portion is of a trapezoidal structure, with the long side being connected to the mounting portion and the short side being connected to the fourth mounting portion 25. It can be seen that for a person skilled in the art, the shape of the body portion 24 can be arbitrarily selected and all the shapes enabling the body portion to enter and to be placed in the lever accommodating space of the weighing sensor can be used in the present invention.

In this embodiment, the fourth mounting portion 25 is mounted to a magnet coil assembly 6, and in another embodiment, the fourth mounting portion 25 may be replaced by the coil assembly, thereby further simplifying the structure of the weighing sensor.

Figure 8:
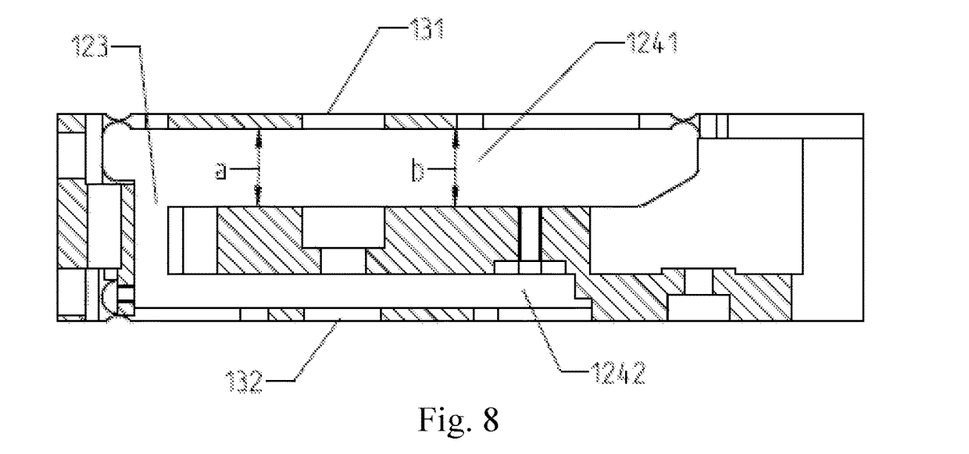
FIG. 8 is a sectional view taken along the centre line of a weighing sensor.

The lever 2 in this embodiment can be disposed in the first receiving space 1241 as shown in FIG. 8, and the thickness of the lever 2 is smaller than the distance a or b between the upper parallel guiding plate 131 and the extension 122. As shown in FIG. 2, the portion with the greatest thickness of the lever 2 in this embodiment is the fourth mounting portion 25, that is, the thickness c of the fourth mounting portion 25 is smaller than the distance a or b between the upper parallel guiding plate 131 and the extension 122.

Figure 9:
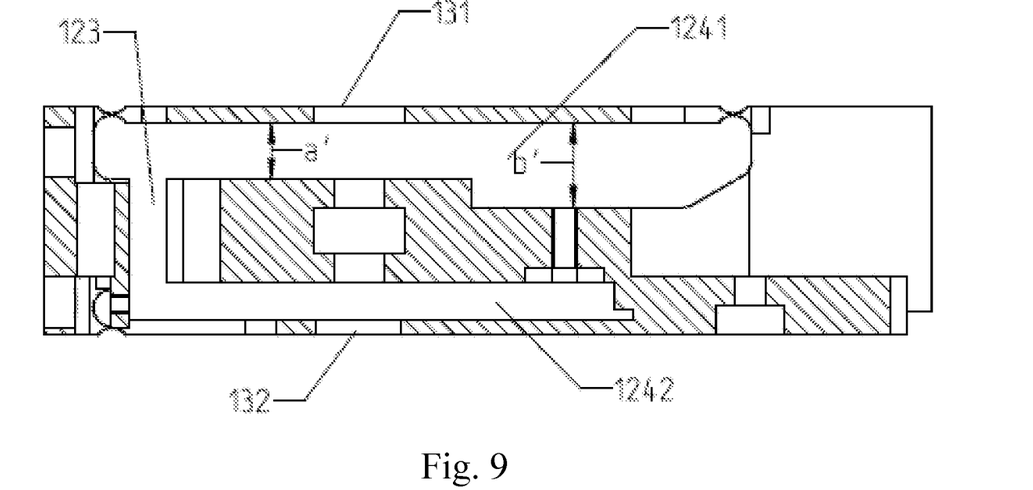
FIG. 9 is a sectional view taken along the centre line of another weighing sensor.

As shown in FIGS. 8 and 9, a housing space of the weighing sensor capable of housing the lever 2 is surrounded and formed by the parallel guiding portion, the fixing portion and the extension thereof, and the load-receiving portion, and the lower parallel guiding plate 132, the load-receiving portion, and a lower surface of the extension form a second receiving space 1242 located in the housing space. The extension and the load-receiving portion are separated by a transversely penetrating gap 123, and the extension and the load-receiving portion in FIGS. 8 and 9 are further connected by a temporary connecting portion to fix the extension and the load-receiving portion.

It can be seen that in this embodiment, the height b of one end of the extension near the fixing portion from the upper parallel guiding plate 131 is equal to the height a of the other end of the extension near the load-receiving portion from the upper parallel guiding plate 131, and the height b of the one end of the extension near the fixing portion from the upper parallel guiding plate 131 and the height a of the other end of the extension near the load-receiving portion from the upper parallel guiding plate 131 are both greater than the distance c from an upper surface 251 of the fourth mounting portion 25 to a lower surface 61 of the coil assembly 6.

At this time, the lever 2 can enter the first receiving space 1241 through the opening between the upper parallel guiding sheet 131 and the extension. Therefore, the assembly of the lever 2 in the weighing sensor is realised. It can be seen that although the lever is assembled in the weighing sensor, it does not have to be assembled on the periphery but is assembled inside, and at the same time, since the lever enters the accommodating space of the weighing sensor through the opening, there is no need to sequentially assemble the components such as the guiding plates, and the assembling steps are simplified while reducing the assembly components.

In another embodiment, as shown in FIG. 9, the height b' of one end of the extension near the fixing portion from the upper parallel guiding plate 131 is greater than the height a' of the other end of the extension near the load-receiving portion from the upper parallel guiding plate 131, the height b' of the one end of the extension near the fixing portion from the upper parallel guiding plate 131 is greater than the distance c from the upper surface 251 of the fourth mounting portion 25 to the lower surface 61 of the coil assembly 6, and the height a' of the other end of the extension near the load-receiving portion from the upper parallel guiding plate 131 is greater than the thickness of the body portion 24 and the fixing portion. Such a height setting can increase the strength of the extension of the weighing sensor.

Furthermore, the widths d and e of the body of the lever 2 in this embodiment are smaller than the width of the through-hole on the upper parallel guiding plate 131, and such a setting enables the lever 2 to be also assembled from the through-hole on the upper parallel guiding plate 131, and the lever can only be assembled from different openings of the weighing sensor.

In another embodiment, for a more compact mechanism, the through-hole on the upper parallel guiding plate 131 is not wide enough to allow the lever 2 to enter, that is, the lever enters the first receiving space 1241 only through the opening between the parallel guiding sheet 131 and the extension.

Furthermore, in this embodiment, the fourth mounting portion 25 is further mounted with a shading sheet of a photoelectric sensor, wherein the shading sheet in this embodiment has a notch, and the photoelectric sensor determines the positional state and the movement state of the lever 2 connected to the shading plate by detecting whether a light ray passes through the notch. In this embodiment, the shading sheets corresponding to the photoelectric sensor of different structures may use shading plates of different structures.

Figure 10:
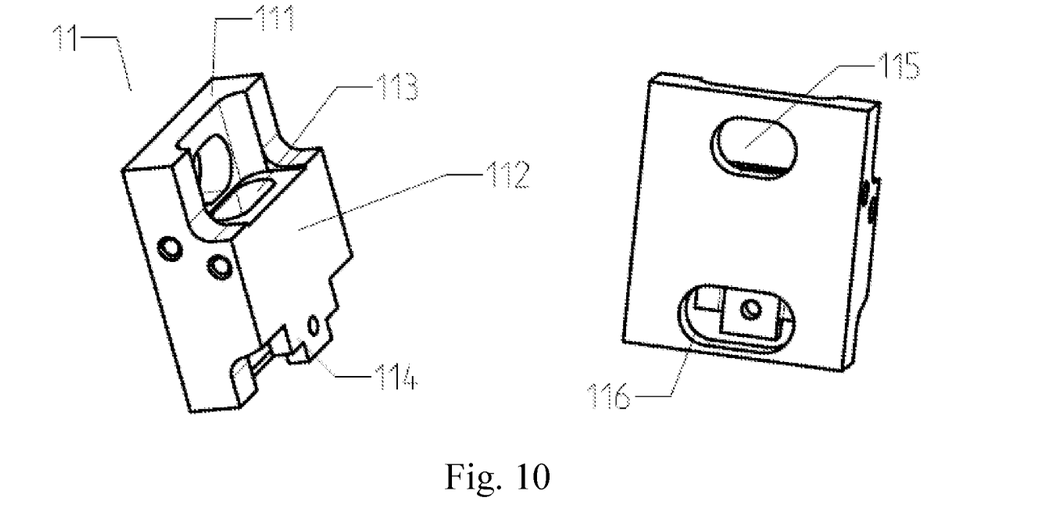
FIG. 10 is a sectional view of a load-receiving portion of the weighing sensor in Embodiment 1 of the present invention.

As shown in FIG. 10, the load-receiving portion 11 comprises a body portion 111 and a first extension 112 extending from the body portion 111 in the direction of the fixing portion 12, a first through-hole groove 113 penetrating vertically from the top to the bottom is provided between the body portion 111 and the first extension 112, a first connection mounting portion 114 for mounting a connecting leaf spring extends from a lower surface of the first extension 112, and the load-receiving portion body 111 comprises a second through-hole groove 115 and a third through-hole groove 116 penetrating in the axial direction. The structure of the load-receiving portion in this embodiment is easier and lighter, and has a stable performance.

In another embodiment, the first extension 112 is provided with a mounting portion for the connecting leaf spring, so that the structure of the load-receiving portion can be further simplified. Moreover, the through-hole 116 faces the mounting portion on the first extension 112.

In yet another embodiment, the through-hole 115 is eliminated to further simplify the structure of the load-receiving portion.

The first connection-mounting portion 114 connects the first connection-mounting portion 114 of the load-receiving portion together with the lever 2 by means of the connecting leaf spring, so as to serve as a force transmission portion of the lever 2. After a load is loaded on the load-receiving portion 11, a force is transmitted to the lever 2 via the connecting leaf spring. Upon that, the lever 2 loses balance, and after the force is enlarged by a long arm of the lever 2, the shading sheet on the tail end of the lever 2 deviates from the original balance position. In this embodiment, the photoelectric displacement sensor detects that the luminous flux passing through the notch of the shading sheet on the lever 2 as shown in the figure changes, and feeds same back to a weighing sensor circuit device to cause the weighing sensor circuit device to generate a corresponding compensating current. This current flows through the coil assembly 6 located at the long arm end of the lever, and the coil assembly 6 produces a compensating force, or referred to as a balance force, in a fixed magnetic field, so that the lever 2 returns to the balance state again, that is, the shading sheet returns to the balance position. The actual weight of the loaded load can be obtained by performing a series of data collection and data processing on the compensating current by means of a circuit part of the electronic balance.

In addition, in this embodiment, the connecting leaf spring may be provided between the body portion 111 and the first extension 112 of the load-receiving portion, which can play a role of protecting the connecting leaf spring and improving the sensor performance, and the structure is also more compact at the same time.

Embodiment 2

Figure 3:
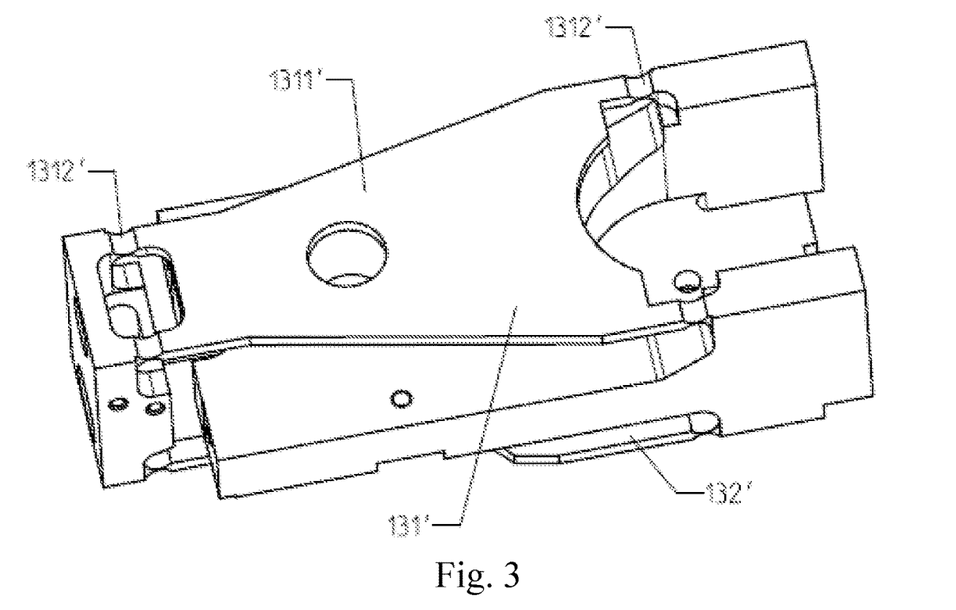
FIG. 3 is a perspective schematic diagram of a weighing sensor in Embodiment 2 of the present invention.

As shown in FIG. 3, the difference between this embodiment and Embodiment 1 lies in the shape and structure of the parallel guiding portion 13' and the lever 2'.

In this embodiment, the parallel guiding portion 13' comprises an upper parallel guiding plate 131' and a lower parallel guiding plate 132', wherein the upper parallel guiding plate 131' comprises a body portion 1311' and thin sheets 1312' at two ends, and the width of the body portion 1311' near the fixing portion 12 in the transverse direction is greater than the width thereof near the load-receiving portion 11 in the transverse direction. At this time, as shown in FIG. 3, the contours at two sides of the upper parallel guiding plate 131' are straight lines, that is, the body portion 1311' forms a trapezoidal-like shape, and the contours at the two lateral sides of the upper parallel guiding plate 131' are hypotenuses of the trapezoid.

Figure 7:
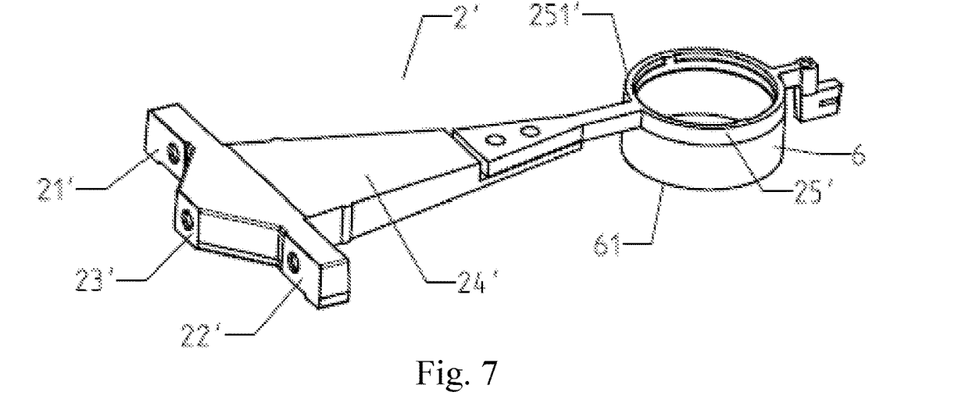
FIG. 7 is a perspective schematic diagram of a lever in Embodiment 2 of the present invention.

As shown in FIG. 7, the lever 2' in this embodiment is of a split structure. The lever 2' comprises a mounting portion connected to the fixing portion of the weighing sensor. The mounting portion comprises a first mounting portion 21', a second mounting portion 22', and a third mounting portion 23', wherein the three mounting portions are connected to the other components of the weighing sensor by means of the leaf springs. As shown in FIG. 4, this embodiment uses the same mounting portion structure as that of Embodiment 1.

In this embodiment, the lever 2' further comprises a body portion 24' formed by a combination of the first body portion and the second body portion which are fixedly connected to each other, wherein the first body portion is integrally formed with the mounting portion, and the second body portion is integrally formed with the fourth mounting portion 25'.

The fourth mounting portion 25' is provided with a coil assembly 6' and a shading sheet, and the distance c from the upper surface 251' of the fourth mounting portion 26' to the lower surface 61' of the coil assembly 6' is the same as that in Embodiment 1.

In another embodiment, the main body portion 24' is formed by connecting three parts in sequence.

That is, the distance between the two lateral sides of the upper parallel guiding sheet 131' in this embodiment linearly changes from the cross-sectional length of the end portion connected to the load-receiving portion to the cross-sectional length of the end portion connected to the fixing portion.

In another embodiment, the contours of the two lateral sides may also be in the form of contours such as arcs. In this embodiment, by means of such an arrangement, the boundary contours at the two lateral sides of the parallel guiding plate 131' are contracted toward the inside of the weighing sensor, so as to avoid accidental touching of the upper parallel guiding plate 131'.

While the particular embodiments of the present invention have been described above, a person skilled in the art should understand that these are merely illustrative, and that the scope of protection of the present invention is defined by the appended claims. Various alterations or modifications to these embodiments can be made by a person skilled in the art without departing from the principle and essence of the present invention; however, these alterations and modifications all fall within the scope of protection of the invention.

What is claimed is:

1. A weighing sensor, arranged to receive a lever for connection to the weighing sensor by one or more leaf springs, comprising:
    a load-receiving portion;
    a fixing portion, having an extension toward the load-receiving portion; and
    a parallel guiding portion, comprising an upper parallel guiding unit and a lower parallel guiding unit, which are separated from each other, the respective parallel guiding units having a first end connected to the load-receiving portion and a second end connected to the fixing portion, thereby connecting the load-receiving portion and the fixing portion;
    wherein the extension is located between the upper parallel guiding unit and the lower parallel guiding unit, at a distance from each of the parallel guiding units, with a gap between the extension and the load-receiving portion, the distance between the extension and the upper parallel guiding unit allowing a lever to pass through and enter into a lever-accommodating space formed by the fixing portion, the upper parallel guiding unit, and the load-receiving portion;
    wherein the load-receiving portion has a protrusion that extends towards the fixing portion, the protrusion having a mounting region adapted for the one or more leaf springs to be mounted; and
    wherein a through-hole, located between the load-receiving portion and the protrusion in a direction perpendicular to the parallel guiding portion provides access to the mounting region for mounting the one or more leaf springs to the lever.

2. The weighing sensor of claim 1, wherein the parallel guiding portion, the fixing portion and the load-receiving portion are integrally formed.

3. The weighing sensor of claim 2, further comprising:
    a temporary connecting sheet, or a connecting portion that is a thin sheet, that detachably connects the extension and the load-receiving portion.

4. The weighing sensor of claim 2, wherein:
    the ends of the upper parallel guiding unit that are connected, respectively, to the load-receiving portion and the fixing portion have the same cross-sectional length; or
    if the cross-sectional lengths are different, then, a distance between two sides of the upper parallel guiding unit changes gradually from the cross-sectional length of the end portion connected to the load-receiving portion to the cross-sectional length of the end portion connected to the fixing portion in a direction from the end portion connected to the load-receiving portion to the end portion connected to the fixing portion.

5. The weighing sensor of claim 4, wherein:
    the change in the distance is linear from the cross-sectional length of the end portion connected to the load-receiving portion to the cross-sectional length of the end portion connected to the fixing portion.

6. The weighing sensor of claim 1, further comprising:
    a mounting portion provided at the protrusion in a direction away from the upper parallel guiding unit.

7. The weighing sensor of claim 1, further comprising:
    at least one through-hole in the load-receiving portion in a direction of the parallel guiding portion, the at least one through-hole facing the mounting portion or the mounting region.

8. A lever, suitable for a weighing sensor of claim 1, the lever comprising:
    a mounting portion connected to the fixing portion of the weighing sensor;
    a coil connecting portion for mounting a coil; and
    a connecting portion, in the nature of a sheet-like triangle having a base which is connected to the mounting portion and an apex which is connected to the coil connecting portion;
    wherein the lever has a thickness that allows the lever to enter the lever-accommodating space of the weighing sensor through an opening provided therein.

9. The lever of claim 8, wherein:
    the coil connecting portion either is a magnet coil assembly or is provided with a magnet coil assembly.

10. The lever of claim 8, wherein the mounting portion, the connecting portion and the coil connecting portion are integrally formed.

* * * * *